(12) United States Patent  (10) Patent No.: US 7,961,104 B2
Bodin et al.  (45) Date of Patent: *Jun. 14, 2011

(54) ITEM POSITION INDICATOR AND OPTIMIZED ITEM RETRIEVAL FOR A SENSOR EQUIPPED STORAGE UNIT

(75) Inventors: William Kress Bodin, Austin, TX (US); Michael Lee Masterson, Cedar Park, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/341,884

(22) Filed: Dec. 22, 2008

(65) Prior Publication Data

US 2009/0099943 A1  Apr. 16, 2009

Related U.S. Application Data

(63) Continuation of application No. 11/467,224, filed on Aug. 25, 2006, now Pat. No. 7,495,561.

(51) Int. Cl.
*G08B 13/14* (2006.01)
(52) U.S. Cl. .................................... 340/572.1
(58) Field of Classification Search .... 340/572.1–572.9, 340/10.1, 825.69; 705/22; 235/462.01
See application file for complete search history.

(56) References Cited

U.S. PATENT DOCUMENTS

| | | |
|---|---|---|
| 4,093,032 A | 6/1978 | Uyama et al. |
| 4,563,739 A | 1/1986 | Gerpheide et al. |
| 4,627,504 A | 12/1986 | Moran |
| 4,964,053 A | 10/1990 | Humble |
| 5,014,798 A | 5/1991 | Glynn |
| 5,335,509 A | 8/1994 | Namisniak et al. |
| 5,418,334 A | 5/1995 | Williams |
| 5,487,276 A | 1/1996 | Namisniak et al. |
| 5,711,160 A | 1/1998 | Namisniak et al. |
| 5,726,880 A | 3/1998 | Bailey et al. |
| 5,920,261 A | 7/1999 | Hughes et al. |
| 6,089,498 A | 7/2000 | Sticht |
| 6,101,826 A | 8/2000 | Bessler |
| 6,158,381 A | 12/2000 | Bray |
| 6,327,576 B1 | 12/2001 | Ogasawara |

(Continued)

FOREIGN PATENT DOCUMENTS

WO  2005015510 A1  2/2005

OTHER PUBLICATIONS

USPTO Final Office Action for U.S. Appl. No. 11/467,214 dated Mar. 18, 2010.

(Continued)

*Primary Examiner* — Phung Nguyen (74) *Attorney, Agent, or Firm* — Yee & Associates, P.C.; David A. Mims, Jr.

(57) ABSTRACT

A computer implemented method, apparatus, and computer program product for communicating the shelf position of an item within a storage unit. An item to be located in the storage unit is identified. The storage unit system determines the shelf position of the identified item. The system then communicates the shelf position of the identified item to the user. If the user requests multiple items, the optimal sequence of retrieval for the items is determined based on a user configurable algorithm.

11 Claims, 6 Drawing Sheets

U.S. PATENT DOCUMENTS

| | | | |
|---|---|---|---|
| 6,393,848 B2 | 5/2002 | Roh et al. | |
| 6,453,687 B2 | 9/2002 | Sharood et al. | |
| 6,481,602 B1 | 11/2002 | Fritze et al. | |
| 6,519,963 B2 | 2/2003 | Maeda | |
| 6,552,663 B2 | 4/2003 | Swartzel et al. | |
| 6,693,539 B2 | 2/2004 | Bowers et al. | |
| 6,741,236 B2 | 5/2004 | Yun | |
| 6,758,397 B2 | 7/2004 | Catan | |
| 6,859,745 B2 | 2/2005 | Carr et al. | |
| 6,892,545 B2 | 5/2005 | Ishikawa et al. | |
| 6,919,795 B2 | 7/2005 | Roseen | |
| 6,975,910 B1 | 12/2005 | Brown et al. | |
| 6,982,640 B2 * | 1/2006 | Lindsay et al. | 340/540 |
| 7,009,519 B2 | 3/2006 | Leonard et al. | |
| 7,017,359 B2 | 3/2006 | Kim et al. | |
| 7,027,958 B2 | 4/2006 | Singh et al. | |
| 7,044,370 B2 | 5/2006 | Bellis, Jr. et al. | |
| 7,053,773 B2 | 5/2006 | McGarry et al. | |
| 7,065,501 B1 | 6/2006 | Brown et al. | |
| 7,096,221 B2 | 8/2006 | Nakano | |
| 7,340,414 B2 | 3/2008 | Roh et al. | |
| 2002/0003531 A1 | 1/2002 | Kim et al. | |
| 2002/0026325 A1 | 2/2002 | Hirahara et al. | |
| 2002/0066279 A1 | 6/2002 | Kiyomatsu | |
| 2002/0139848 A1 | 10/2002 | Catan | |
| 2002/0143624 A1 | 10/2002 | Catan | |
| 2002/0157411 A1 | 10/2002 | Ishikawa et al. | |
| 2002/0178066 A1 | 11/2002 | Roh et al. | |
| 2003/0014323 A1 | 1/2003 | Scheer | |
| 2003/0015585 A1 | 1/2003 | Wike, Jr. et al. | |
| 2003/0061129 A1 | 3/2003 | Todd et al. | |
| 2004/0009465 A1 | 1/2004 | Luckanatinvong | |
| 2004/0031274 A1 | 2/2004 | Cho et al. | |
| 2004/0035123 A1 | 2/2004 | Kim et al. | |
| 2004/0100380 A1 | 5/2004 | Lindsay et al. | |
| 2004/0253733 A1 | 12/2004 | Prusik et al. | |
| 2004/0254759 A1 | 12/2004 | Kubach et al. | |
| 2005/0008539 A1 | 1/2005 | Matsuura et al. | |
| 2005/0082376 A1 | 4/2005 | Lubow et al. | |
| 2005/0086108 A1 | 4/2005 | Sakamoto et al. | |
| 2005/0132725 A1 | 6/2005 | Menten et al. | |
| 2005/0155372 A1 | 7/2005 | Dentella et al. | |
| 2005/0258961 A1 | 11/2005 | Kimball et al. | |
| 2006/0006999 A1 | 1/2006 | Walczyk et al. | |
| 2006/0055530 A1 | 3/2006 | Wang et al. | |
| 2006/0119484 A1 | 6/2006 | Chishima et al. | |
| 2006/0178947 A1 | 8/2006 | Zsigmond et al. | |
| 2006/0190363 A1 | 8/2006 | Brown et al. | |
| 2006/0199155 A1 | 9/2006 | Mosher | |
| 2006/0210115 A1 * | 9/2006 | Nemet | 382/104 |
| 2006/0237427 A1 | 10/2006 | Logan | |
| 2007/0035380 A1 | 2/2007 | Overhultz et al. | |
| 2007/0046552 A1 | 3/2007 | Marino | |
| 2007/0103304 A1 | 5/2007 | Newton et al. | |
| 2007/0251521 A1 | 11/2007 | Schackmuth et al. | |
| 2008/0047282 A1 | 2/2008 | Bodin et al. | |
| 2008/0052001 A1 | 2/2008 | Bodin et al. | |
| 2008/0052037 A1 | 2/2008 | Bodin et al. | |
| 2008/0052200 A1 | 2/2008 | Bodin et al. | |
| 2008/0052201 A1 | 2/2008 | Bodin et al. | |
| 2008/0052202 A1 | 2/2008 | Bodin et al. | |
| 2008/0094214 A1 | 4/2008 | Azevedo et al. | |

OTHER PUBLICATIONS

USPTO Office Action for U.S. Appl. No. 11/467,190 dated Apr. 19, 2010.

Scher, "RFID Shelf Antennas Featuring Dynasys de-Q Tuning", pp. 1-7, retrieved May 30, 2006 http://rfidusa.com/superstore/product_info.php?cPath=21_39_60&products_id=223.

Lindsay et al., "Retial RFID Systems Without Smart Shelves", 2003, pp. 1-13, retrieved May 30, 2006 http://www.jefflindsay.com/rfid1.shtml.

Gilbert, "Major retailers to test smart shelves", ZDNet News: Jan. 8, 2003, pp. 1-6, retrieved May 31, 2006 http://news.zdnet.com/2100-9584_22-979710.html.

"itag", iTAG RFID—Smart Shelf, AC/Corporation, pp. 1-2, 2003-2006, retrieved May 12, 2006, http://www.ac-corporation.com.ph/products/iTAG/solutions/shelves.asp.

"Automated Livestock management with RFID-Driven Production Systems—15 Years of Work Applying RFID Technology to the Real World", Osborne Industries Inc., 2005, pp. 1-26.

* cited by examiner

ITEM POSITION INDICATOR AND OPTIMIZED ITEM RETRIEVAL FOR A SENSOR EQUIPPED STORAGE UNIT

This application is a continuation of application Ser. No. 11/467,224, filed Aug. 25, 2006, status allowed.

BACKGROUND OF THE INVENTION

1. Field of the Invention

The present application relates generally to an improved data processing system and in particular to a method and apparatus for retrieving stored items. Still more particularly, the present invention is directed to a computer implemented method, an apparatus, and a computer program product for communicating the position of items in a storage unit equipped with a sensor shelf.

2. Description of the Related Art

Finding individual items in storage systems may be time consuming and cumbersome. Often when storing items on a shelf, only the first row of items is visible. Since the items in the first row often block the view of items behind them, items in front rows may need to be removed to find items in back rows. Removing and replacing more items than are necessary to retrieve the wanted item is inefficient and time consuming.

One solution has been to place items in fixed locations on the shelves; however, this solution may cause inefficiencies in the number of items that may be stored. Fixed locations may limit the capacity of a storage system by forcing empty spaces where the specific items slotted for that specific space are out of stock. Personnel may need to constantly redefine shelf space and update documentation to provide the flexibility needed, thus causing further inefficiencies.

SUMMARY OF THE INVENTION

The illustrative embodiments described herein provide a computer implemented method, apparatus, and computer program product for communicating the shelf position of an item within a storage unit. An item to be located in the storage unit is identified. The storage unit system determines the shelf position of the identified item. The system then communicates the shelf position of the identified item to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The illustrative embodiments pertain to the communication of the shelf position of identified items within a storage unit system. The shelf position of an identified item is the position of the item on the shelf. In a storage unit system equipped with sensor shelves, the shelf position of an identified item may be known. Item location may also be determined by RFID triangulation or any other method that can associate an item to a location within a storage unit system.

The illustrative embodiments provide a computer implemented method, an apparatus, and a computer usable program product to indicate, to the user, the shelf position of the identified items. Therefore, an overview of a storage unit system in which aspects of the illustrative embodiments may be implemented will be provided in this document.

Items to be retrieved from a storage unit may be identified using a Universal Product Code. A Universal Product Code (UPC) is a machine-readable bar code coupled with a human-readable Universal Product Code number. The Universal Product Code includes a six-digit manufacturer identification number that provides information regarding a product, such as the manufacturer identification and product item number. A unique universal product code is not assigned to more than one product.

A Universal Product Code scanner may read a Universal Product Code associated with a particular product to identify the product. However, to maintain current inventories, each item in an inventory must be manually scanned with a bar code reader.

Radio Frequency Identification (hereafter RFID) may be used to identify, locate, and track items in an inventory. RFID is an automated identification method that is typically utilized in automating integrated supply chains within retail and distribution to identify and/or locate items currently in stock. RFID systems utilize RFID readers and RFID tags to identify objects associated with a RFID tag.

An RFID reader is a device that includes a transmitter and a receiver. The reader transmits an interrogate signal to RFID tags within an interrogate zone of the reader. As used herein, an interrogate zone is a zone or region in which an interrogate signal has sufficient strength to be received by a RFID tag within the interrogate zone and trigger the RFID tag to transmit a radio frequency in response to the interrogate signal.

RFID tags, also referred to as transponders, identification tags, or smart tags, are small integrated circuits coupled with an antenna to transmit data. A RFID tag may be attached to or incorporated into an item package or into the item itself.

Multiple RFID tags may reside within an interrogate zone of a RFID reader. In response to receiving an interrogate signal, RFID tags transmit a radio frequency response signal to the reader via an antenna associated with the tag. The response signal typically includes identification data, such as an identification code.

The reader receives the radio frequency response transmissions from the identification tags. The reader may identify a product based on the identification code included in the response signal. The reader may also estimate an approximate location of the tag based on the strength and direction of the response signal.

Each RFID tag in the interrogate zone may be individually recognized by the RFID tag reader based on the identification codes transmitted by each tag. Thus, a RFID tag reader may take an entire inventory of all items within an interrogate zone having a RFID tag without requiring intervention of a human user.

The storage unit system may be equipped with mass sensor shelves. A mass sensor shelf comprises a grid of independent mass sensors on the top of the shelf. As an item rests on the shelf, the system controller identifies and tracks the mass footprint of the item. A mass footprint is the shape of the surface of the item resting on the mass sensors in addition to the weight of the item. However, those of ordinary skill in the art will appreciate that other methods of identifying the location of the item within the storage unit system that may exist can be implemented by the illustrative embodiments.

The illustrative embodiments satisfy the need for a system to communicate, not only a location of and item within a storage unit, but pinpoint the position of the item on a shelf. Therefore, the illustrative embodiments provide a computer implemented method, an apparatus, and a computer program product for indicating the shelf position of items in a storage unit to the user.

The user requests the position of an item using a user-interface. The system controller identifies the item and searches for the mass footprint of the item in the local database. The system then determines the shelf position of the item based on the location of the mass footprint of the item as stored in the database in this example. The system then communicates the shelf position of the item to the user.

As used herein, an item includes, but is not limited to, an individual consumable product in a single container, multiple consumable products in a single container, a carton or case of multiple containers, a pallet of multiple cartons or cases, and/or a load, such as a truckload, shipload, or railcar load, having multiple pallets. As used herein, a container is any disposable or reusable package, receptacle, carton, can, jar, or any other object to hold, carry, or enclose one or more items for transport and/or storage.

Figure 1:
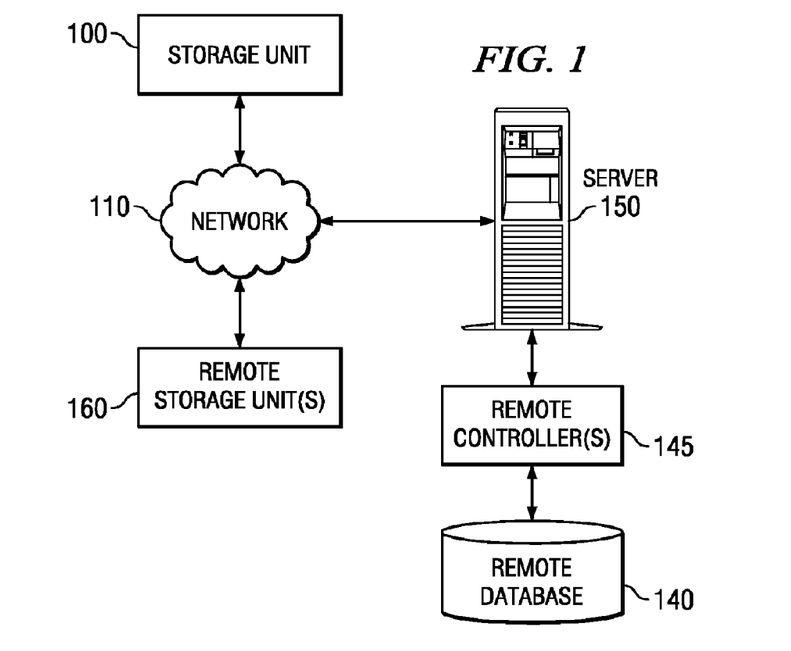
FIG. 1 is a pictorial representation of a network of storage units in accordance with an illustrative embodiment.

FIG. 1 is a pictorial representation of a network of storage units in accordance with an illustrative embodiment. Storage unit 100 is a storage unit connected to network 110. Network 110 is a medium used to provide communication links between various devices and storage units connected together, such as storage unit 100 and remote storage unit(s) 160. Network 110 may include connections, such as wire, wireless communication links, or fiber optic cables.

Storage unit 100 connects to network 110 along with one or more remote storage unit(s) 160. In addition, remote databases(s) 140 and remote control unit(s) connect to network 110 via one or more servers, such as server 150. In the depicted example, server 150 provides data, such as boot files, operating system images, and applications to remote controller(s) 145 and remote storage unit(s) 160. Network 110 may include additional servers, clients, and other devices not shown.

Figure 2:
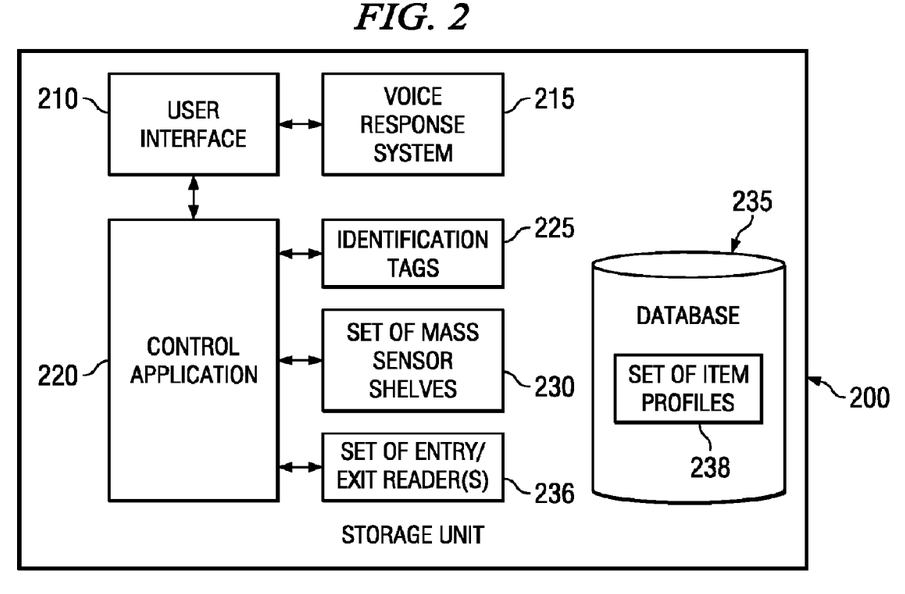
FIG. 2 is a pictorial representation of a storage unit in accordance with the illustrative embodiments.

FIG. 2 is a pictorial representation of a storage unit in accordance with the illustrative embodiments. Storage unit 200 is a storage unit, such as storage unit 100 and remote storage unit(s) 160 in FIG. 1. User interface 210 provides a digital display for providing output to a user, as well as a keypad and/or touch screen for receiving input from a user. User interface 210 is associated with voice response system 215. Voice response system 215 includes a microphone, speaker, and voice synthesizer. Voice response system 215 permits users to provide verbal input to control application 220. Voice response system 215 also permits users to receive verbal output from control application 220.

Control application 220 is an application for receiving input and sending output to a user via user interface 210. Control application 220 also identifies items associated with an identification tag from set of identification tags 225. Each identification tag in set of identification tags 225 is associated with a given item in storage unit 200 or a given item to be placed in storage unit 200. Each identification tag has a unique item identification code associated with the identification tag. In this illustrative example, set of identification tags 225 is a set of RFID tags associated with a set of consumable items inside storage unit 200.

Set of mass sensor shelves 230 is a set of one or more customized shelves having a mass sensor grid on an upper surface of the shelf. Each mass sensor associated with a mass sensor shelf is an independent sensor capable of measuring a mass of an object resting on the mass sensor. Each mass sensor transmits mass sensor measurements in the form of mass sensor data to control application 220.

Control application 220 stores sensor data and item identification data for each item in the storage unit in database 235. Database 235 may be a local or remote database. Sensor data for an identified item may include a mass footprint as well as an identification code from each identification tag in set of identification tags 225. Each identification code is associated with an item description. The item description describes the item. For example, an item description for cereal could be "Apple Jacks®," or "Frosted Flakes®." Item identification data is stored in database 235 as set of item profiles 238.

Set of entry/exit reader(s) 236 is a set of one or more entry/exit reader(s). Entry/exit readers are used to identify an item as well as to determine an approximate location of an item and a precise location of an item. An approximate location of an item may be determined by a single entry/exit reader. The entry/exit reader receives a response signal from an identification tag. Control application 220 may determine an approximate location of the identification tag based on the strength and direction of the response signal. The entry/exit reader generates approximate location coordinates for the approximate location of the identification tag.

Control application 220 may determine a precise location by triangulating a set of approximate coordinates generated by three or more location sensors, such as set of entry/exit readers 236. The triangulated coordinates form a set of precise coordinates for the precise location of the identified item in storage unit 200. The precise location including the shelf position may then be communicated to the user.

Set of entry/exit reader(s) are activated by control application 220 each time a door on storage unit 200 is opened. Each time set of entry/exit reader(s) 236 is activated, set of entry/exit reader(s) 236 generates an interrogate signal. In response to receiving the interrogate signal, set of identification tags 225 generates a response signal. Set of entry/exit reader(s) 236 identifies and locates the items associated with set of identification tags 225 based on the response signals.

Thus, in this illustrative example, control application activates set of entry/exit readers 236 when control application 220 detects a door of storage unit 200 is opened. An entry/exit reader transmits an interrogate signal. The entry/exit reader identifies an item based on a response signal received from an identification tag associated with the item as the item enters storage unit 200 to form an identified item.

After a user places the identified item on a mass sensor shelf in storage unit 200, control application 220 determines a position of the identified item by requesting mass sensor data from set of mass sensor shelves 230.

Control application 220 generates current mass footprint data providing a mass footprint and current weight for each item on each mass sensor shelf in storage unit 200. Control application 220 generates mass footprint data based on mass data received from mass sensor shelves. Control application 220 compares the current mass footprint data to previous mass footprint data for each mass sensor shelf in set of mass sensor shelves 230. Previous mass footprint data is stored in database 235. Previous mass footprint data is data regarding the mass footprint and the mass of each item on a mass sensor shelf in set of mass sensor shelves 230 the last time a user opened a door of storage unit 200.

In this illustrative embodiment, control application 220 determines a location for a set of mass sensors registering a change in mass sensor data. The location of the change in mass sensor data is estimated to be the approximate location of the given item placed inside the storage unit.

In the alternative, control application 220 verifies that only a single identification tag was detected entering a given mass sensor shelf. If control application 220 determines that more than one identified item was detected entering the same mass sensor shelf and/or mass sensor data is received from more than one set of mass sensors on the same mass sensor shelf, control application 220 will make an educated guess as to which set of mass sensor data is associated with each identified item based on an identification of the item, a non-depleted mass for each item, an initial mass for each item, a prior mass for each item, and/or current mass measurements received from each set of mass sensors. Control application 220 prompts the user to confirm the identification and estimated location of each item via user interface 210.

Control application 220 may estimate which set of mass sensor data is associated with each identified item when two or more items are removed from storage unit 200 or entered into storage unit 200 by comparing previous mass footprints to current mass footprints to determine which mass footprint belongs to which identified item. Other factors, such as previous mass, mass footprint shape, previous items removed from storage unit 200, and items due to be replaced, may be looked up in a database to determine which mass footprint data belongs to which item.

Figure 3:
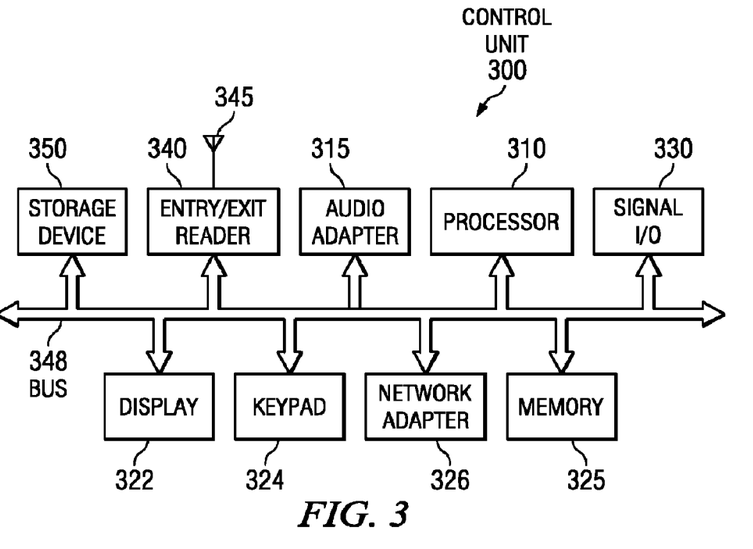
FIG. 3 is a block diagram of a control unit for the storage system in accordance with the illustrative embodiments.

FIG. 3 is a block diagram of a control unit for the storage system in accordance with the illustrative embodiments. A control unit, in the illustrative embodiments, is an application that analyzes the mass data from the set of mass sensors to determine the current mass of the object. In an alternative embodiment, the control unit may be an application that triangulates the exact position of the item using RFID or other method of triangulation. Control unit 300 is an example of hardware for implementing a control application, such as the control application 220 in FIG. 2. Control unit 300 is hardware in which code or instructions implementing the processes of the illustrative embodiments may be located. Control unit 300 executes computer usable program code for controlling entry/exit readers, mass sensor shelves, and a user interface in accordance with the illustrative embodiments.

Processor 310, audio adapter 315, memory 325, display 322, keypad 324, network adapter 326, and signal input/output (I/O) 330 are connected via bus 348. Bus 348 may be comprised of one or more buses, such as a system bus and/or an I/O bus. Bus 348 may be implemented using any type of communications fabric or architecture that provides for a transfer of data between different components or devices attached to the fabric or architecture.

Processor 310 may include one or more processors or CPUs. Memory 325 may be a main memory, a read only memory (ROM), a random access memory (RAM), flash memory, a cache, or any other known or available memory for storing data, instructions, and/or computer usable program code. Control Unit 300 retrieves data, instructions, and/or code from memory, such as main memory or read only memory. In addition, control Unit 300 may retrieve data, instructions, and/or code from a remote memory location via a network connection.

Display 322 may include a touch screen display, an LED display, or any other type of known or available display for presenting output to a user or receiving input from a user. Keypad 324 is any type of known or available alphanumeric keypad for a user to provide input in the form of data, instructions, or program code to Control Unit 300.

Network adapter 326 is coupled to the system to enable the data processing system to become coupled to other data processing systems or remote printers or storage devices through intervening private or public networks. Modems, cable modem and Ethernet cards are just a few of the currently available types of network adapters.

Signal input/output 330 includes one or more devices for sending and receiving signals to and from different components in a storage unit, such as a digital display and keypad, a touch screen, a voice recognition interface, an LED display, and/or any other known or available devices for sending and receiving input and output.

Entry/exit reader 340 is a tag reader such as set of entry/exit reader(s) 236 in FIG. 2. Entry/exit reader 340 transmits an interrogate signal to determine an identification and/or location of identification tags within an interrogate zone of entry/exit reader 340.

Control Unit 300 is coupled to entry/exit reader 340 via bus 348. Control unit 300 activates entry/exit reader 340 to transmit an interrogate signal to identify any RFID tags within an interrogate zone of entry/exit reader 340. Storage device 350 is also optionally connected to bus 348. Storage device 350 may include any type of permanent and removable storage media. In addition, storage device 350 may include a remote storage device or storage provided by a storage service. Program code and instructions are located on storage device 350 and may be loaded into memory 325 for execution by processor 310.

The processes of the illustrative embodiments are performed by processor 310 using computer implemented instructions, which may be located in memory 325. Processor 310, memory 325, signal input/output 330, and storage device 350 are functional components that may be implemented as functions in an application specific integrated circuit rather than using a processor paradigm.

Figure 4:
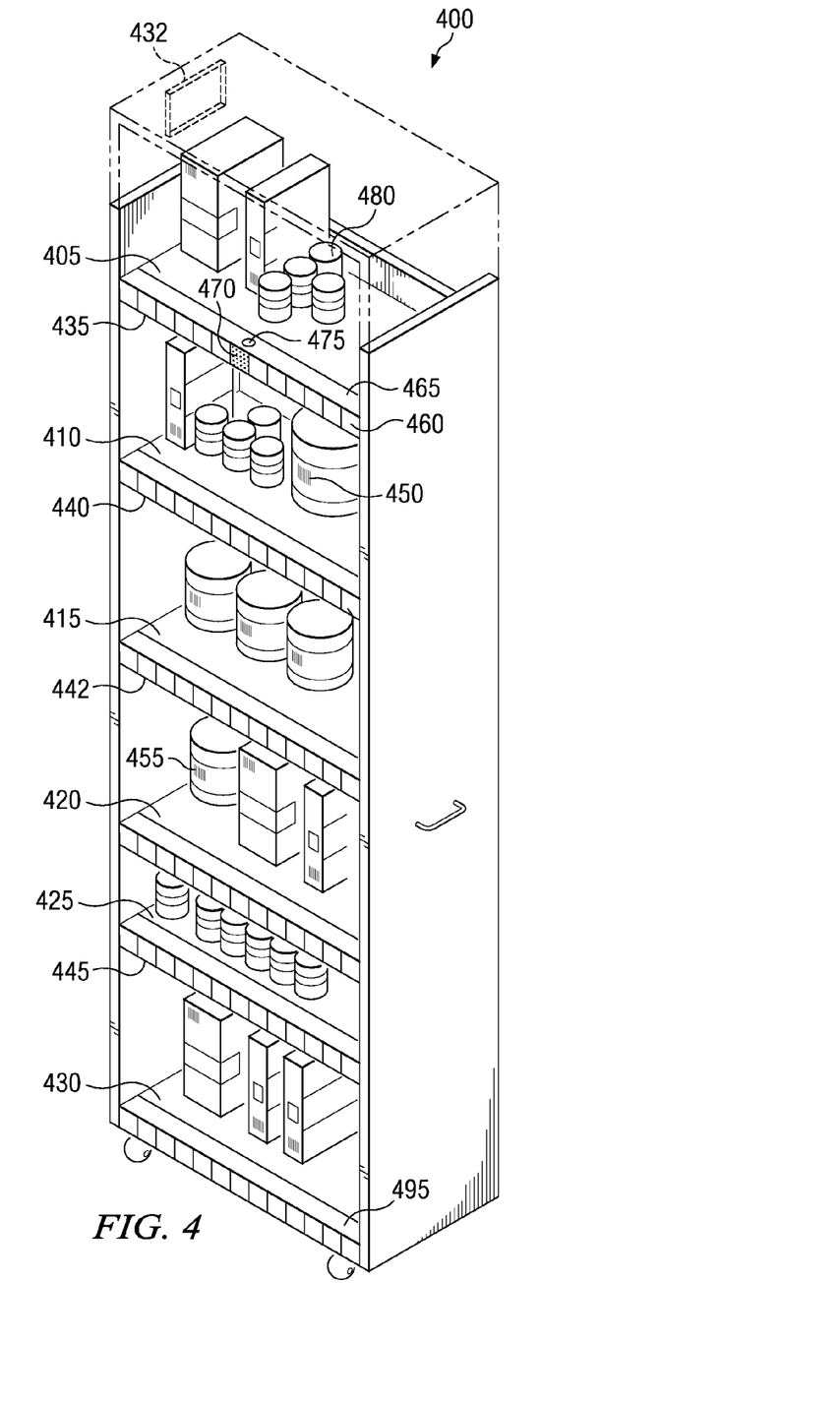
FIG. 4 is a block diagram of a set of sensor shelves, entry/exit readers, and item indicators in accordance with the illustrative embodiments.

FIG. 4 is a block diagram of a set of mass sensor shelves, entry/exit readers, and item indicators in accordance with the illustrative embodiments. An item indicator in accordance with the illustrative embodiments is a communication device for indicating the placement of an item on a shelf. Set of shelves 400 is a storage unit such as storage unit 100 in FIG. 1. Set of shelves 400 includes a set of mass sensor shelves 405-430. In this example, set of shelves 400 includes six mass sensor shelves. The top surface of set of shelves 400 is transparent for illustration purposes. In accordance with the illustrative embodiments, set of shelves 400 may include any number of mass sensor shelves, at any width. For example, set of shelves 400 may be a small set of shelves in a private home, or a large set of shelves the length of a supermarket aisle.

Set of shelves 400 also includes a set of entry/exit readers, such as entry/exit readers 432, 435, 440, 442, and 445. Set of shelves 400 contains consumable items, which may have identification tags, such as identification tags 450 and 455. In this example, identification tags 450 and 455 are RFID tags.

In this example, entry/exit readers 432-445 are RFID readers. Entry/exit readers 432-445 are activated by the controller to transmit an interrogate signal. The interrogate signal is received by a set of identification tags when a change in mass sensor data from a set of mass sensors associated with a mass sensor shelf is detected. As used herein, a set of identification tags includes a single identification tag, as well as two or more identification tags.

Front facing shelf position indicator 460 is a column indicating, front facing light panel. Light 470 is shown activated. Light 470 shown in item indicator 460, is associated with the column of mass sensors, on mass sensor shelf 405 that contains identified item 480. Thus, although the user may not be able to see identified item 480, the user may quickly ascertain the position of identified item 480 by referring to the item indicator. In this example, the user may retrieve identified item 480, by removing the two cans that are in front of identified item 480.

Item indicator 465 is a top facing light panel. As seen from the figure, a top facing item indicator may be the most visible configuration for bottom shelves, such as item indicator 495. Front facing indicators and top facing indicators may be used together or separately, in accordance with the illustrative embodiments. However, for illustration, item indicator 465 is shown on the top shelf in conjunction with front facing item indicator 460. Pinpoint indicator 475 is shown activated on top facing indicator 465. Pinpoint indicator 475 indicates not only the column but also the depth at which identified item 480 may found on mass sensor shelf 405. Pinpoint indicators may be positioned as front facing and column indicators may be positioned as top facing. Indicators may also be mounted adjacent to shelves in accordance with the illustrative embodiments.

Set of shelves 400 may also include a user interface, not shown in the figure. The user interface may be a digital display and keypad that provides output to a user and accepts input from the user. The user interface may include an item indicator in accordance with the illustrative embodiments. The user interface may also include voice recognition software, a microphone, a speaker, and a voice synthesizer for accepting verbal/audio input from a user and providing verbal/audio output to a user.

The user interface may also be remote to set of shelves 400 as in the illustrated example. The user interface may be located in a central location in a kitchen or the user interface may be located on a shopper's cart in a grocery store.

In accordance with an alternative example, entry/exit readers 432-445 are Universal Product Code scanners and identification tags 450-455 are Universal Product Code bar codes. In this example, a user must manually scan identification tags 450-455 at one of entry/exit readers 432-445 when an item associated with identification tags 450-455 are placed inside set of shelves 400 and/or removed from set of shelves 400.

Those of ordinary skill in the art will appreciate that the storage units depicted may vary. The depicted examples are not meant to imply architectural limitations with respect to the illustrative embodiments. For example, a storage unit in accordance with the illustrative embodiments could also include a pantry, a refrigerator, a cupboard, a closet, a portable storage unit, retail store shelves, warehouse shelves or an oven.

Figure 5:
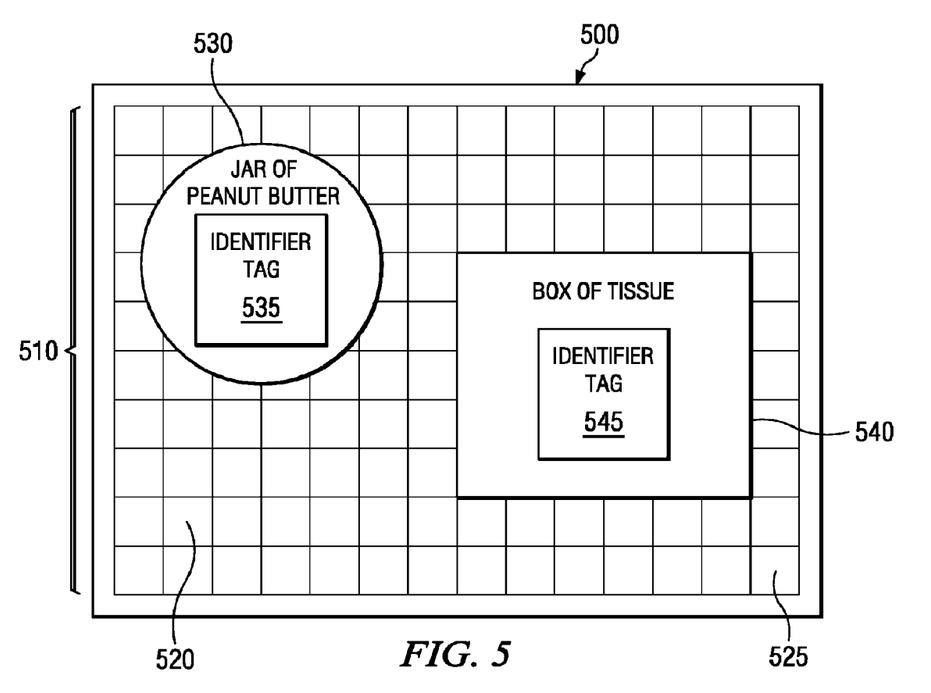
FIG. 5 is a block diagram of a mass sensor shelf having a mass sensor grid and consumable items on the shelf in accordance with the illustrative embodiments.

FIG. 5 is a block diagram of a mass sensor shelf having a mass sensor grid and consumable items on the shelf in accordance with the illustrative embodiments. Mass sensor shelf 500 is a mass sensor shelf inside a storage unit, such as set of shelves 400 in FIG. 4. Mass sensor shelf 500 has a mass sensor grid 510 spanning the entire area of an upper surface of mass sensor shelf 500. Mass sensor grid includes a plurality of mass sensors, such as mass sensor 520 and mass sensor 525.

Each block in mass sensor grid 510 represents an individual mass sensor in the plurality of mass sensors. Each sensor is separate and isolated from every other sensor in the mass sensor grid. In this illustrative example, mass sensors 520-525, are tiny mass sensors measuring one centimeter by one centimeter. In accordance with the illustrative embodiments, mass sensors may be any shape and any size mass sensors. For example, mass sensors 520-525 may measure one centimeter by two centimeters, or any other size.

Mass sensors in mass sensor grid 510 may measure a mass of an item wholly or partially placed on top of a given mass sensor. Thus, when an object is placed on a mass sensor shelf, each mass sensor covered by the object will generate mass data regarding a portion of the object. The process utilizes mass data from the set of mass sensors covered by an object on a mass sensor shelf to determine a mass of the object.

Jar of peanut butter unit 530 is located on mass sensor shelf 500. Unit 530 rests on a set of mass sensors of mass sensor grid 510. The set of mass sensors generates mass data regarding the mass of unit 530. Unit 530 is associated with identifier tag 535. Identifier tag 535 is read by an entry/exit reader to identify unit 530 as a jar of peanut butter.

In this example, a box of tissue is also located on mass sensor shelf 500. The box of tissue unit 540 is associated with identifier tag 545. An entry/exit reader utilized identification data available from identifier tag 545 to identify unit 540 as a box of tissue. A set of mass sensors covered by unit 540 generate mass data regarding the mass of unit 540.

Thus, when an object is placed on a mass sensor shelf, the object will rest on a set of mass sensors on the portion of the shelf covered by the object. Each mass sensor in the set of mass sensors transmits mass data regarding the mass of the object to a controller.

Control application, such as control application 220 in FIG. 2, creates a mass footprint for the identified item. The mass footprint is an impression of a shape of a portion of the identified item in contact with a portion of the mass sensor shelf. The portion of the mass sensor shelf in contact with the identified item is the set of mass sensors transmitting mass data regarding the mass of the identified item. In this example, unit 530 has a mass footprint indicating a current mass of unit 530 and a shape of a surface of unit 530 in contact with mass sensor shelf 500. The shape indicated by the mass footprint is round. In this example, either the top or bottom of a jar of peanut butter is in contact with a portion of mass sensor shelf 500.

Likewise, the mass footprint for unit 540 indicates a current mass of unit 540 as well as a shape of a surface of unit 540 in contact with a portion of mass sensor shelf 500. In this example, unit 540 has a square shaped mass footprint, as a surface of the box of tissues in contact with mass sensor shelf 500 is square. In this case, the surface of the box of tissues in contact with a portion of mass sensor shelf 500 may be a top, a bottom, or a side of a square box of tissues.

Figure 6:
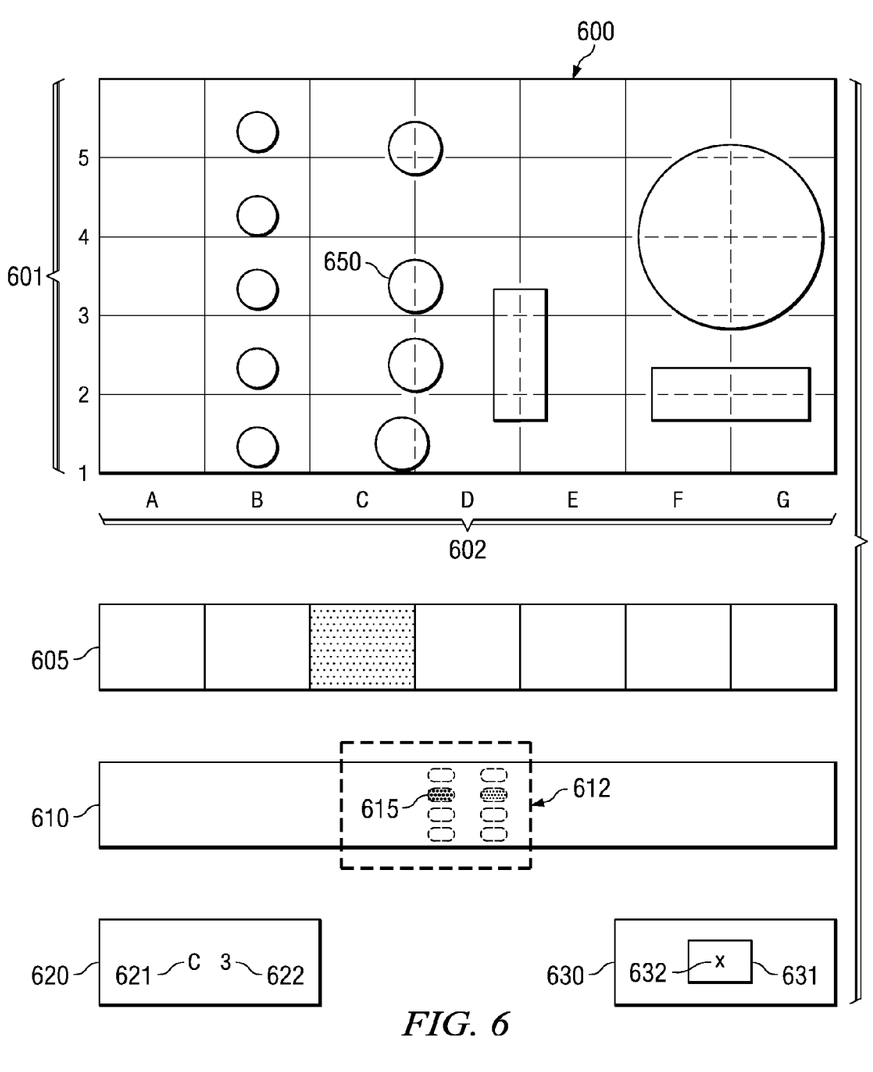
FIG. 6 is a pictorial representation of item indicators in association with a shelf matrix in accordance with the illustrative embodiments.

FIG. 6 is a pictorial representation of item indicators in association with a shelf matrix, in accordance with the illustrative embodiments. The mass sensor shelf may be thought of as a matrix. A top view of mass sensor shelf 600 is depicted with matrix grid lines as in mass sensor grid 510 of FIG. 5. However, the matrix grid lines used to communicate the position of an item on the shelf may or may not mirror the mass sensor grid. The mass sensor grid may be too fine to be useful as a communication tool. Rows 601 are labeled as numbers and columns 602 are labeled as letters. The mass sensor matrix is included in the figure to illustrate the association between the mass sensor shelf and the item indicator examples. In this example, four cans are placed on mass sensor shelf 600 primarily in column C. Identified item 650 is positioned in the third row; therefore, in this example identified item 650 is in shelf matrix position C3.

Item indicator 605 is an example of an indicator such as 460 in FIG. 4. The front face of indicator 605 provides a visual indication of the position of a selected item on the mass sensor shelf. Indicator 605 is a column indicator that shows the column on the shelf matrix in which the selected item is located. Item indicator 605 may comprise light emitting diodes (LEDs), incandescent lights, or a display screen.

Item indicator 610 has a display that is in a matrix configuration, which may also comprise light emitting diodes (LEDs), incandescent lights, or a display screen. In this example, the visual indicator has ovals 612 that are representative of the shelf matrix 600. Ovals 612 are displayed in columns and rows to more precisely pinpoint the item position to the user. Those of ordinary skill in the art will appreciate that the shelf matrix may be configured in numerous ways.

Upon identifying an item, the controller communicates the position of the item to a user, by activating the indicator in the shelf matrix corresponding to the position of the item on the shelf. If the identified item is large, several pinpoint indicators may be activated. In this illustration the shelf matrix corresponding to the item indicator is approximately, the size of one can.

As shown, pinpoint indicator 615 is activated. Reading the matrix on the face of the shelf aids the user in finding the item on the shelf. The user may easily see that the item is positioned in column C and in the third row of the shelf.

In another example, the mass sensor shelf includes lights embedded within the shelf. One or more lights corresponding to a section of the shelf at the location of the identified item is lit to indicate the position of the item on a given shelf. The shelf itself lights up in the appropriate location, clearly identifying the shelf position of the identified item.

Another type of indicator is matrix-label display 620. In a matrix-label display, column 621 and row 622 labels are spelled out on a display screen. A text to auditory system may be used in conjunction with, or separate from, each method of visual display. In this example, the user may hear the storage system repeat "C3."

Yet another type of indicator is a diagram indicator, the indicator may be a display of shelf 631 with the position of the identified item marked with a blinking "X" 632, the name of the item or other symbol.

Each embodiment of indicator may be displayed as front viewing, top viewing or adjacent to the shelf the indicator represents, or the indicator may be a display remote from the shelf unit.

Figure 7:
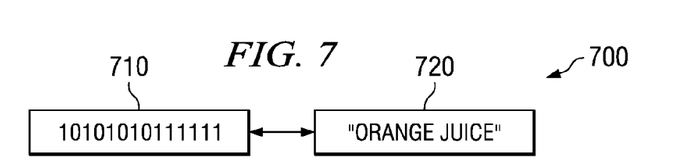
FIG. 7 is a block diagram illustrating an association of an identification code from an identifier tag with a consumable item description in accordance with the illustrative embodiments.

FIG. 7 is a block diagram illustrating an association of an identification code from an identifier tag with a consumable item description, in accordance with the illustrative embodiments. Data structure 700 is an example of data stored in a database, such as local database 235 in FIG. 2 and remote database 140 in FIG. 1.

The description pair includes a machine-readable identification code, such as "10101010111111" associated with identification tag 710. The pair also includes a human readable item description 720 that is associated with identification code "10101010111111" associated with identification tag 710. Other examples of identification codes include, for example, "1234564," "A," or any other code that is unique among all identification codes that a tag reader may read.

In this illustrative example, identification tag 710 having code "10101010111111" is associated with item description "orange juice" 720. An item description is a human understandable description of an item. Human understandable descriptions are for example, text, audio, graphic, or other representations suited for display or audible output.

A user interface and tag reader operates cooperatively with identification tags to identify items for placement in a storage unit and/or identify items already placed inside a storage unit. Identification tags, such as identification tag 710 may be any type of identification tag, including Universal Product Code (UPC) bar code identification tags and RFID tags. RFID tags include read-only identification tags and read-write identification tags. A read-only identification tag is a tag that generates a signal in response to receiving an interrogate signal from an entry/exit reader. A read-only identification tag does not have a memory. A read-write identification tag is a tag that responds to write signals by writing data to a memory within the identification tag. A read-write tag may respond to interrogate signals by sending a stream of data encoded on a radio frequency carrier. The stream of data may be large enough to carry multiple identification codes.

Figure 8:
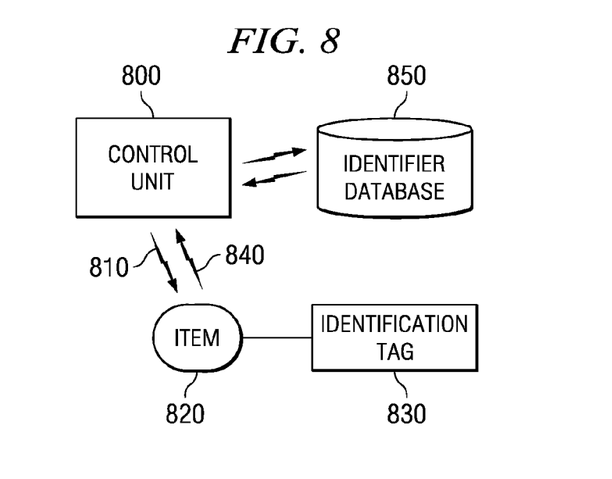
FIG. 8 is a block diagram illustrating an interaction of a user interface and tag reader with an identification tag in accordance with the illustrative embodiments.

FIG. 8 is a block diagram illustrating an interaction of a user interface and tag reader with an identification tag in accordance with the illustrative embodiments. Control unit 800 is a control unit such as control unit 200 in FIG. 2. Control unit 800 includes a user interface and entry/exit reader(s). Control unit 800 activates an entry/exit reader associated with a storage unit to generate an interrogate signal 810 to form an interrogation zone. Item 820 is located within the interrogation zone of the entry/exit reader. Identification tag 830 associated with item 820 receives interrogate signal 810. In response to receiving interrogate signal 810, identification tag 830 generates response signal 840 via an antenna on the identification tag.

Control unit 800 receives response signal 840. Control unit 800 analyzes response signal 840 to identify an identification code for item 820. Control unit 800 identifies item 820 by identifying an item description, such as item description 720 in FIG. 7, in identifier database 850 associated with the identifier code for identification tag 830.

Figure 9:
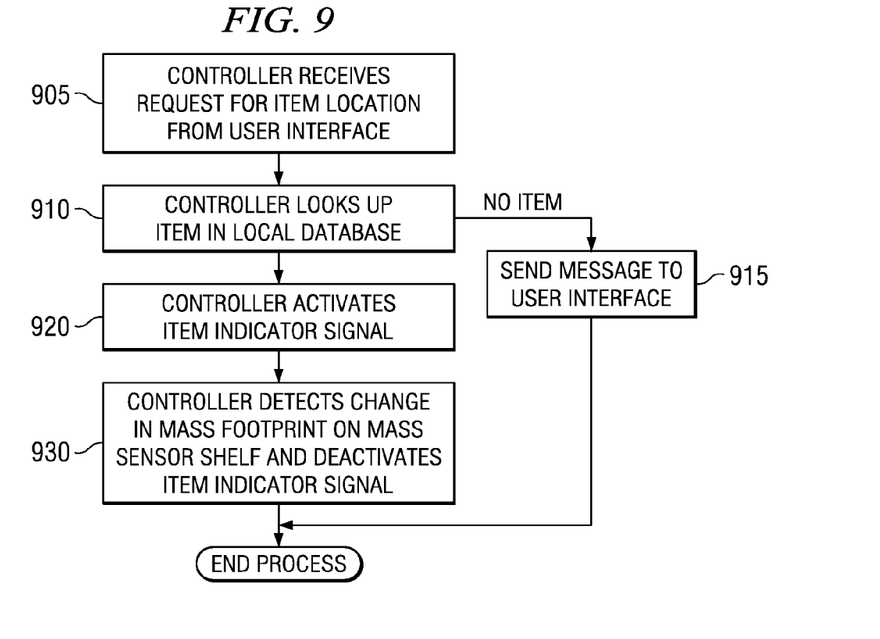
FIG. 9 is a flowchart illustrating a process for communicating the position of an item in a storage unit in accordance with an illustrative embodiment.

FIG. 9 is a flowchart illustrating a process for communicating the position of an item in a storage unit, in accordance with the illustrative embodiments. The process begins when a user, using the user interface as in 210 of FIG. 2, requests the shelf position of an item (step 905). The controller, such as control application 220 of FIG. 2, identifies the item or series of items within the local database (step 910), such as database 235 of FIG. 2. If the items are not found in the database, the controller sends an appropriate signal to the user interface (step 915) and the process ends. Returning to step 910, if the item or series of items are identified in the local database, the controller activates a signal to an item indicator (step 920). The item indicator indicates the identified item to the user. The user then locates and removes the item from the mass sensor shelf. After the controller receives a signal from the mass sensor shelf that the identified item has been removed, the controller deactivates the item indicator signal (step 930) and, the process terminates thereafter.

Figure 10:
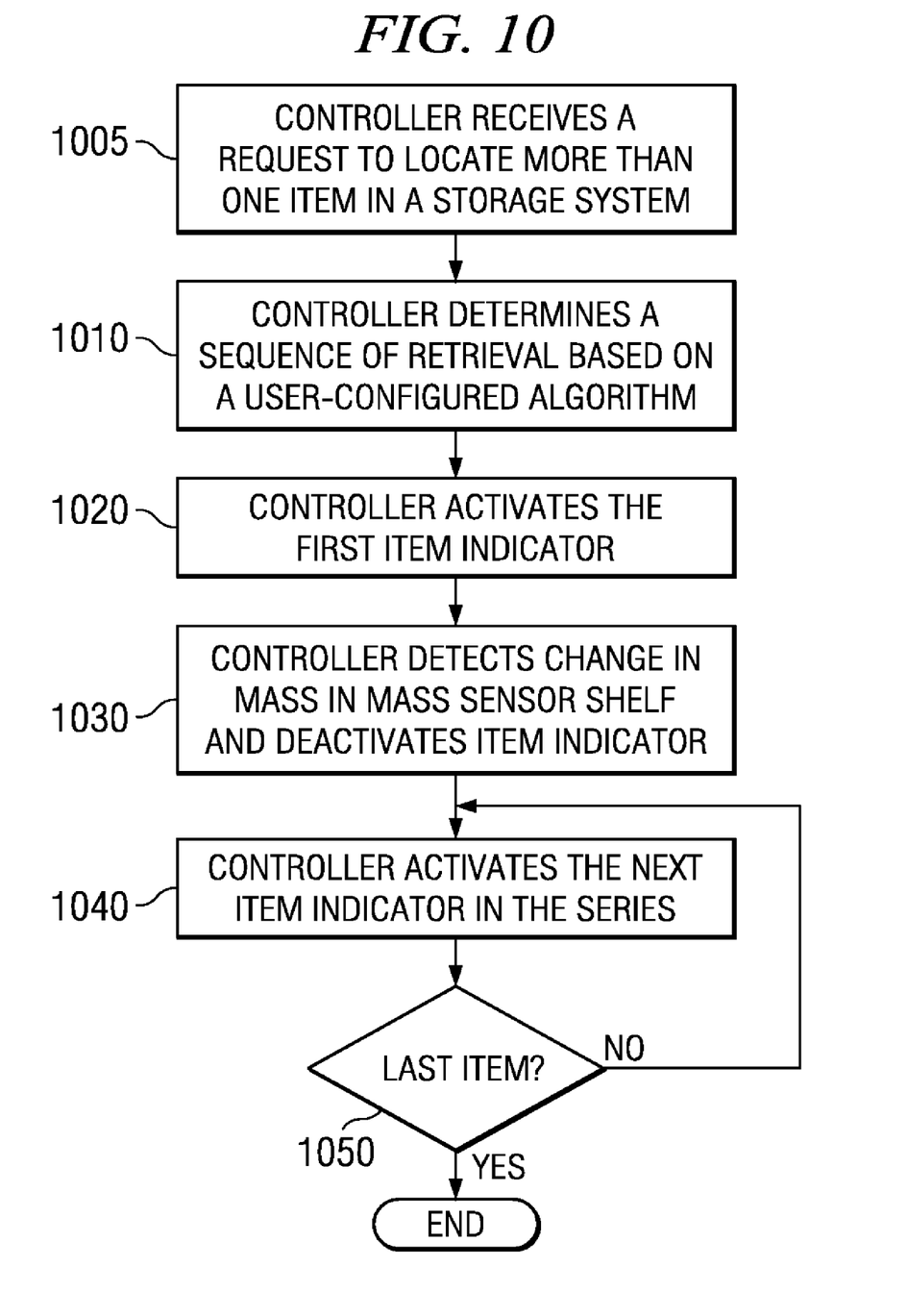
FIG. 10 is a flowchart illustrating a process for indicating multiple items in a storage system in accordance with the illustrative embodiments.

FIG. 10 is a flowchart illustrating a process for indicating multiple items in a storage system, in accordance with the illustrative embodiments. The controller receives a request from the user interface to locate more than one item in the storage system (step 1005). The controller determines a sequence of retrieval based on a user-configured algorithm (step 1010). The optimal retrieval sequence is the best order to retrieve the items identified, based on the user-configured algorithm. The user-configured algorithm may be based on the least number of non-selected items to be removed and replaced on the shelves. The user-configured algorithm may also be based on other factors such as other users accessing items, the relative perishability of items, and the weight of items, to name a few examples.

Once the sequence has been determined in step 1010, the controller activates the item indicator of the first identified item in the sequence (step 1020). When the controller determines that the item has been removed from the shelf by detecting the change in the mass sensors on the mass sensor shelf, the controller deactivates that item indicator (step 1030). A determination is made as to whether the item is the last item in the sequence (step 1050). If no, (no output of step 1050) then the process goes back to step 1040. If yes, (yes output of step 1050) then the process terminates.

The illustrative embodiments provide a computer implemented method, apparatus, and computer usable program product for communicating the shelf position of an item within a storage unit. The user requests that the storage unit system find an item in the storage unit. The storage unit system identifies the item in the storage unit. The system determines the shelf position of the identified item. The system then communicates the shelf position of the identified item to the user. If the user requests multiple items, the computer implemented method, apparatus, and computer usable program product determines the optimal sequence of retrieval for the items based on a user configurable algorithm.

The invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for identifying a placement of an item within a storage unit, the apparatus comprising:
   a user interface;
   a tag reader; and
   a controller, wherein the controller further comprises:
      a bus;
      a storage device connected to the bus, wherein the storage device contains a computer usable program product; and
      a processor unit, wherein the processor unit executes the computer usable program product to identify the item to be located, to form an identified item; to determine a shelf position of the identified item on a shelf in a set of shelves in the storage unit, wherein determining the shelf position further comprises receiving a signal from an identification tag associated with the identified item by a set of entry/exit readers coupled to the set of shelves, and determining the shelf position based on the signal from the identification tag, wherein the shelf position is a precise location of the identified item on the shelf in the set of shelves; and to communicate the shelf position of the identified item to a user.

2. The apparatus of claim 1 wherein the storage unit is of a refrigeration unit, a freezer, an ice box, a retail store, a stockroom, a pantry, a cupboard, a cabinet, a furnace, or a warehouse shelf.

3. The apparatus of claim 1 wherein the processor unit executes the computer usable program product to communicate the shelf position of the identified item further comprises the processor unit executes the computer usable program product to activate an item indicator associated with the set of shelves.

4. The apparatus of claim 1 wherein the indicator is selected from a group consisting of at least one of a graphic on a display screen, an auditory device, an LED display, a light panel, or a combination visual and auditory device.

5. The apparatus of claim 1 wherein the indicator is an audio device providing a text-to-voice message providing the shelf position of the identified item to the user.

6. A computer program product for identifying a placement of an item within a storage unit, the computer program product comprising:

a computer hardware having computer usable program code tangibly embodied thereon, the computer usable program code comprising:

computer usable program code for identifying the item to be located, to form an identified item;

computer usable program code for determining a shelf position of the identified item on a shelf in a set of shelves in the storage unit, wherein the computer usable program code for determining the shelf position further comprises computer usable program code for receiving a signal from an identification tag associated with the identified item by a set of entry/exit readers coupled to the set of shelves, and computer usable program code for determining the shelf position based on the signal from the identification tag, wherein the shelf position is a precise location of the identified item on the shelf in the set of shelves; and computer usable program code for communicating the shelf position of the identified item.

7. The computer program product of claim 6 wherein the storage unit is one of a refrigeration unit, a freezer, an ice box, a retail store, a stockroom, a pantry, a cupboard, a cabinet, a furnace, or a warehouse shelf.

8. The computer program product of claim 6 wherein computer usable program code for communicating the shelf position of the identified item further comprises activating an item indicator associated with the set of shelves.

9. The computer program product of claim 6 wherein the item indicator is selected from a group consisting of at least one of a graphic on a display screen, an auditory device, an LED display, a light panel, or a combination visual and auditory device.

10. The computer program product of claim 6 wherein the indicator is an audio device providing a text-to-voice message providing the shelf position of the item to the user.

11. The computer program product of claim 6 further comprising:

computer usable program code for determining an optimal retrieval sequence of a set of items, wherein the set of items comprises the identified item; and computer usable program code for communicating the optimal retrieval sequence of the set of items.

* * * * *